UNITED STATES PATENT OFFICE

EARLE C. PITMAN, OF PRINCETON, NEW JERSEY, ASSIGNOR TO E. I. DU PONT DE NEMOURS & COMPANY, OF WILMINGTON, DELAWARE, A CORPORATION OF DELAWARE

PROCESS FOR PREVENTING SPONTANEOUS COMBUSTION

No Drawing.  Application filed July 13, 1928.  Serial No. 292,604.

This invention relates to the spontaneous combustion of oxidizable substances and more particularly to the prevention of the spontaneous combustion of spray dust from coating compositions containing oxidizable matter.

Paint and varnish are quite commonly applied to articles by means of an air actuated spray gun which procedure considerably reduces the cost of application as compared to the old brushing process and it also produces a smoother coating. When quick drying lacquers and enamels, such as those having a nitrocellulose base, are used their quick drying character makes spraying even more advantageous, thus air spraying is used almost universally for finishing automobiles with nitrocellulose enamels. The spray dust is usually removed by means of exhaust fans through hoods connected to an exhaust line. Part of this spray dust settles and collects on the inside of the exhaust line. So long as no oxidizable materials are present there is no danger of spontaneous combustion but frequently drying oils, such as linseed and China-wood oils, are introduced to impart desirable characteristics to the lacquers. Likewise, resins such as the so-called glyptal class, may be modified by the combination of the resin with a drying oil acid. Spray dust from such compositions oxidizes so rapidly that there is considerable heating and serious danger of spontaneous ignition. Once a fire is started, there is likelihood of a spray dust explosion or a fire which may spread with extreme rapidity through the exhaust system over the entire factory.

An object of this invention is to prevent the spontaneous combustion of the spray dust of coating compositions containing oxidizable matter. A further object is to oxidize such spray dust so slowly as to avoid the danger of spontaneous combustion and at the same time to permit the coating composition to oxidize normally on the article being coated. Other objects will appear hereinafter.

These objects are accomplished by my invention of a process for treating the spray dust with a suitable anti-oxidant.

I have found that any substance which inhibits the oxidation of the particular composition being sprayed may suitably be used as a spray anti-oxidant. It is desirable to use an anti-oxidant, a solution of which can be sprayed, as it is more effective the greater its degree of sub-division. Hydroquinone and tannic acid are examples of such anti-oxidants. The anti-oxidant may be sprayed dissolved in any suitable organic solvent, or in water. The following examples illustrate a spraying lacquer and an anti-oxidant suitable for treating the spray dust of this lacquer, and in addition comparative spontaneous combustion tests with and without the anti-oxidant:—

Spraying lacquer

| | Parts by weight |
|---|---|
| Low viscosity nitrocellulose | 10.0 |
| Glyptal resin (RX-1718) containing 50% linseed oil | 15.0 |
| 5% cobalt linoleate in turpentine | 1.0 |
| Denatured ethyl alcohol | 5.0 |
| Butyl acetate | 13.6 |
| Xylol | 8.0 |
| Butyl alcohol | 4.4 |
| Toluol | 34.5 |
| Ethyl acetate | 8.5 |
| | 100.0 |

Anti-oxidant solution

| | Parts by weight |
|---|---|
| Hydroquinone | 0.05 |
| Denatured alcohol | 99.95 |
| | 100.00 |

In carrying out spontaneous combustion tests, the two above described solutions were sprayed simultaneously on cheesecloth to collect the dust, the spray guns being so adjusted that both solutions were discharged at the same rate, hence .05 parts of hydroquinone was used for 25 parts of lacquer solids. This is 1/5% based on the lacquer solids or 2/3% based on the linseed oil content. The cheesecloth coated with this dust was then tested for spontaneous combustion in a Mackey cloth oil tester, the jacket being kept at a constant temperature of 77° C. by refluxing carbon tetrachloride in it. Another test was made using the above lacquer without anti-oxidant; the results of these tests are given in the following tabulation which indicate that at a temperature of 77° C. the amount of anti-oxidant used was sufficient to entirely eliminate any danger of spontaneous combustion of lacquer dust which decomposed and fired when no inhibitor was present.

*Spontaneous combustion tests at 77° C.*

| Minutes in testing machine | Temperature (°C.) | |
|---|---|---|
| | Without hydroquinone | With hydroquinone |
| 0 | 37 | 53 |
| 5 | 52 | 66 |
| 10 | 61 | 71 |
| 20 | 72 | 74 |
| 30 | 82 | |
| 33 | 91 | |
| 34 | 100 | |
| 35 | 110 | |
| 36 | 130 | |
| 37 | 142 | |
| 38 | Fired | |
| 75 | | 77 |

The above example is designed to demonstrate that as little as 2/3% hydroquinone based on the linseed oil content of the lacquer is amply sufficient to prevent spontaneous combustion, even when the spontaneous combustion tests are conducted at a temperature as high as 77° C.

Equal volumes of lacquer and anti-oxidant were sprayed purely as a matter of convenience but it would not be commercially desirable to use such a large volume of anti-oxidant solution, it being preferable to use a much higher concentration of hydroquinone in alcohol, say 3 or 4%, and reduce the amount of anti-oxidant solution sprayed to a corresponding extent. For instance, one part of a 4% hydroquinone solution in denatured alcohol will be sufficient to prevent the spontaneous combustion of spray dust from 80 parts of the lacquer described herein. Considerably less anti-oxidant is required in actual practice where the dust is seldom heated much above room temperature. Similar tests on the same lacquer using 0, .1, .3, and .5% hydroquinone were conducted at 100° C. using boiling water in the jacket of the testing apparatus. In this series of tests the .5% solution of hydroquinone was quite effective so that the temperature did not exceed 101° C., although the other three mixtures heated up to at least 150° C. within 40 minutes. The minimum amount of anti-oxidant which will be effective will depend to a considerable degree upon the type of oxidizing materials present, as well as upon the proportions and nature of the other non-volatile constituents. For instance, highly pigmented compositions are much less liable to spontaneous combustion than clear lacquers.

The anti-oxidant may preferably be introduced into the exhaust system and its introduction may be continuous coincident with the spraying of the coating composition, or periodic, probably two or three times a day, depending on the nature of the coating composition, the amount sprayed and the regularity of the spraying operation.

This process renders safe the application by spraying of coating compositions containing materials which oxidize rapidly. By its use the advantage of rapid drying to a hard film of the coating itself, due to oxidation, can be realized without involving the usual hazard of spontaneous combustion of the spray residue. The spontaneous heating of this residue is much more serious in the case of lacquers than it is for paint type materials, since nitrocellulose itself is subject to decomposition at elevated temperatures. In addition, when compositions containing oxidizable materials are sprayed, ordinarily the spray booths and as much as possible of the exhaust system must be carefully cleaned, at least daily. By ths use of my process, these precautions are unnecessary thereby saving considerable labor and avoiding the temporary loss of the use of the equipment.

As many apparently widely different embodiments of this invention may be made without departing from the spirit and scope thereof, it is to be understood that I do not limit myself to the specific embodiments thereof except as defined in the appended claims.

I claim:

1. Process for preventing the spontaneous combustion of the spray residue of coating compositions containing oxidizable matter, which comprises treating said spray residues with a suitable anti-oxidant.

2. Process for preventing the spontaneous combustion of the spray residue of coating compositions containing linseed oil, which comprises treating said spray residue with hydroquinone.

3. Process for preventing the spontaneous combustion of the spray residue of coating compositions containing oxidizable matter, which comprises treating said spray residue with an anti-oxidant of the group comprising hydroquinone and tannic acid.

In testimony whereof, I affix my signature.

EARLE C. PITMAN.